March 27, 1962  A. C. GSTALDER  3,026,724
DEVICE TO MEASURE AND REGISTER AUTOMATICALLY
ANGULAR DISPLACEMENT
Filed June 28, 1956
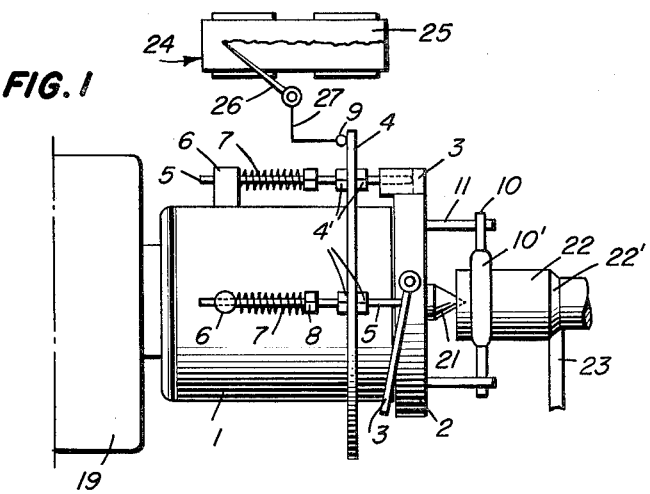
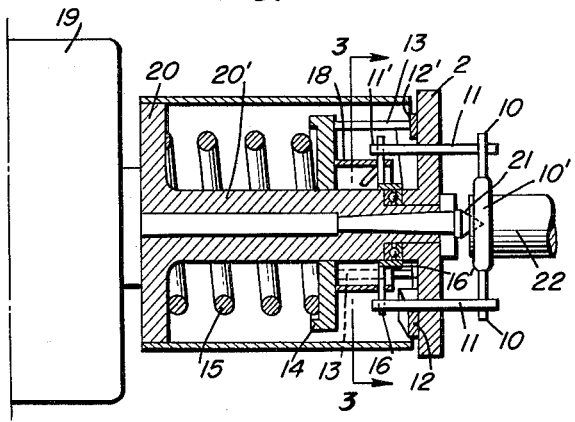
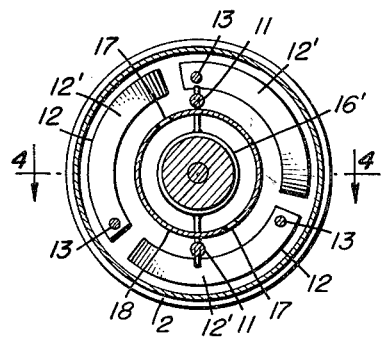
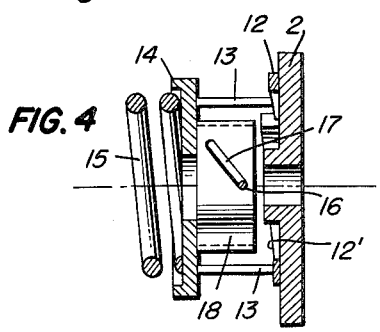
INVENTOR
Alphonse Celestin Gstalder
ATTORNEY United States Patent Office 3,026,724
Patented Mar. 27, 1962

3,026,724
DEVICE TO MEASURE AND REGISTER AUTOMATICALLY ANGULAR DISPLACEMENT
Alphonse Celestin Gstalder, 45 Rue des Laitieres, Vincennes, France
Filed June 28, 1956, Ser. No. 594,663
4 Claims. (Cl. 73—136)

This invention relates to measuring apparatus and particularly to an apparatus for measuring and registering changes in relative rotational or angular displacement between a pair of rotating members and of torque transmitted through a driven member.

This apparatus is particularly useful in measuring and registering or recording relative angular displacements between two rotating members, and such displacement may be used to indicate the torque transmitted through a driven member and thereby to indicate the torque or force exerted by a member outside or disconnected from the driven member which exerts a braking or resisting force upon the driven member. By a proper calibration of the measurement of the rotational or angular displacement between the two relatively rotatable members, a measure also can be obtained of the resisting or braking force which is exerted upon the driven member. This may be very useful in determining the type and amount of resistance which is to be exerted upon the driven member to obtain the most efficient and practical operation thereof.

A practical adaptation of the present type apparatus is to be found in a device for measuring the force which is exerted upon a workpiece, such as the force exerted in turning-down a workpiece in a lathe by a suitable cutting or finishing tool. In such instances, the nature of the workpiece and the use to which it is to be placed often will determine the rate at which material can be cut away from the workpiece by the tool in order to obtain the desired reduction in the size of the workpiece in a minimum practical time without damage to the workpiece or to the tool. The nature of the finish to be obtained on the workpiece also is a determining factor in the rate at which the material can be cut away from the workpiece. This rate of cutting the workpiece depends upon the speed at which the surface of the workpiece travels and the pressure of the tool against the surface of the workpiece which is being cut away. These two factors can be expressed in terms of the resisting torque exerted upon the workpiece by the cutting tool, and this resisting torque is substantially equal to the torque transmitted by the workpiece. A measurement of the torque transmitted through the driven workpiece is, therefore, a measure of the torque exerted thereon by the cutting tool.

Variations in the torque transmitted through the driven workpiece indicate variations in the speed of the workpiece and the force exerted thereon by the cutting tool. Such variations in the torque transmitted by the workpiece will result in transient variations in the speed of the workpiece, and these variations result in relative rotational or angular displacements between the workpiece and a freely rotatable member driven by the workpiece. Such a freely rotatable member normally rotates synchronously with the driven workpiece. When the speed of the workpiece is not constant, as during acceleration of the workpiece, the freely rotatable member will tend to lag behind the workpiece with a resultant angular displacement therebetween in one direction, and, when the workpiece decelerates, as when a cutting tool is applied thereto, or when the pressure of the cutting tool is increased on the workpiece, the freely rotatable member will tend to continue rotating at the speed of the workpiece before the application of increased pressure thereon by the tool, while the workpiece will be slowed down under these conditions. This latter will result in a relative angular or rotational displacement between the workpiece and the freely rotatable member in the opposite direction from that which occurs when the workpiece is accelerating. A measurement of such angular or rotational displacements can be made to be directly indicative of the torque transmitted through the driven workpiece and can also be used to indicate the force exerted on the workpiece by a tool.

In accordance with this invention, an apparatus is provided for obtaining a relative rotational or angular displacement between a driven member and a freely rotatably supported member driven by the driven member, and cam and follower members, provided for translating such relative rotational or angular displacement into relative linear displacements, are utilized to actuate a measuring device which may indicate, record, or register the displacement in terms of torque or in terms of force exerted upon the driven member by a tool. In view of the fact that a cutting tool tends to change the diameter of the workpiece on each successive cut, it is more practical to measure the torque transmitted and to make some indication or record or the diameter of the workpiece during each cut in order to determine more accurately the force exerted thereon by the tool. If desired, a suitable adjustment in the measuring device can be provided so as to regulate the indication provided by the device in accordance with the diameter at which the tool is operating upon the workpiece and thus to give a direct reading in terms of the force of the tool on the workpiece.

An object of this invention is to provide an improved apparatus for measuring relative rotational and angular displacements between a pair of rotating members.

Another object of this invention is to provide an improved apparatus for measuring and registering changes in torque transmitted by a rotatable member.

Further objects and advantages of this invention will become apparent from the following description referring to the accompanying drawing in which:

FIG. 1 is a side elevational view, partly diagrammatically represented, of an embodiment of a measuring apparatus incorporating improved features of this invention;

FIG. 2 is a fragmentary side elevational view, partly in section, illustrating the interior of rotatable parts of the apparatus shown in FIG. 1;

FIG. 3 is a sectional view, taken along line 3—3 of FIG. 2, with the outer housing removed; and FIG. 4 is a sectional view, along line 4—4 of FIG. 3, with the central supporting member and the lathe center removed and showing a part of the compression spring shown in FIG. 2.

Referring to the drawing, this invention is shown in connection with a lathe of the metal-turning type having a conventional tail stock 19 and a rotatable center plate 20 formed with an axially extending cylindrical hub portion 20′. This hub portion 20′ forms a rotatable supporting member for a conventional lathe center 21 and for certain rotatable members of the measuring apparatus comprising this invention. A workpiece 22 is mounted in the lathe between the center 21 and any suitable mounting and driving clamp or center, not shown in the drawing. The workpiece 22 is adapted to be driven by the clamp or center and normally turns freely around its support on the lathe center 21.

In order to turn down the workpiece 22 to a predetermined size and configuration, a suitable cutting tool 23 is adapted to be applied to the surface of the workpiece 22 and to be pressed against the surface with a predetermined force or pressure at a desired rate of longitudinal travel. When the workpiece 22 is rotated, the tool 23 will normally be moved linearly or axially of the workpiece 22 and exert a pressure thereon normal to the cutting surface. This cutting face, which is illustrated in FIG. 1 as an angular surface 22', may extend at various angles and will depend upon the type of cutting edge on the tool 23. Removal of material from the workpiece 22 by the tool 23 results in the exertion of a braking or decelerating force upon the workpiece, and, when the tool is first applied to the workpiece, this will tend to slow down the workpiece 22. Variations in the depth of cut by the tool 23 upon the workpiece 22 also will result in variations in the braking or decelerating force exerted upon the workpiece. When the tool 23 and the lathe are operated in a manner so as to take a substantially uniform cut from the workpiece, the speed of the workpiece will remain substantially constant during such cutting operation.

In order to measure the force exerted by the tool 23 upon the workpiece 22, in accordance with this invention, an apparatus is provided for measuring the relative rotational or angular displacement between the workpiece 22 and a freely rotatable member. This freely rotatable member comprises a relatively rotatable flange 2, which is rotatably supported on the hub 20' of the center plate 20. This rotatable flange 2 is adapted to be driven by the driven workpiece 22 through a connecting clamp 10' secured to the driven workpiece 22 and having a plurality of outwardly extending driving fingers 10, which are adapted freely to engage a corresponding plurality of axially extending coupling fingers 11 with a lost motion engagement therewith, such that a driving force is exerted by the clamp fingers 10 upon the coupling fingers 11 in only one direction of rotation. The coupling fingers 11 are rigidly mounted in the rotatable flange 2 and extend through this flange on both sides thereof.

A follower flange 14 is rotatably supported on the hub 20' of the center plate 20 and is provided with a plurality of axially extending follower fingers 13 which are adapted to engage cam surfaces 12' of a corresponding plurality of cams 12 suitably mounted on the inner surface of the rotatable flange 2. A resilient calibrated compression spring 15 is arranged between the center plate 20 and the adjacent surface of the follower flange 14 so as to bias the follower flange toward the rotatable flange 2, thereby biasing the follower fingers 13 into engagement with the cam surfaces 12' of the rotatable flange 2. This spring biased engagement of the follower fingers 13 with the cam surfaces 12' exerts a predetermined force on the rotatable flange 2 which tends to resist relative rotational or anguler displacement of the rotatable flange 2 and the follower flange 14.

A driving connection is provided between the follower flange 14 and the driven workpiece through the clamp 10'. This includes an arrangement of the inner ends 11' of the coupling fingers 11 in which they are adapted to engage a corresponding plurality of outwardly extending coupling rods 16. These coupling rods 16 are mounted upon a collar 16' which is rotatably supported on the hub 20' of the center plate 20, and the end of these coupling rods 16 extend outwardly through angular or spiral slots 17 in a cylindrical cage 18 rigidly mounted in any suitable manner on the follower flange 14. As is more clearly shown in FIG. 2, the ends 11' of the coupling fingers 11 engage the outwardly extending coupling rods 16 so as to provide a driving connection therewith in both directions of rotation. Thus, when a driving force is exerted upon the workpiece 22 so as to drive the clamp 10' and its driving fingers 10, a force is exerted upon the coupling rods 16 and these rods tend to turn the cylindrical cage 18 at a corresponding speed. The location of the coupling rods 16 in the slots 17 tends to cause an axial displacement of the cage 18 relative to the rotatable flange 2 on acceleration and deceleration of the rotatable flange 2 corresponding to similar changes in the driven workpiece 22 and provides a desired lost motion connection therebetween responsive to such rotational or angular displacements between the rotatable flange 2 and the follower flange 14. This tends to produce a corresponding axial displacement of the follower flange 14 which is resisted by the compression spring 15.

The coupling flange 14 and its associated driving and coupling elements are adapted to be protected against damage by the arrangement of a cylindrical housing 1 around the outside thereof, suitably mounted upon the center plate 20, with a relatively small clearance between the outer edge of the housing 1 and the inner face of the rotatable flange 2, as is more clearly shown in FIG. 2.

As shown in FIG. 1, a follower plate 4, in the form of an annular ring, is arranged around the outer periphery of the housing 1 and is provided with a plurality of axially extending follower rods 5. These rods 5 extend slidably through apertures in bosses 6 on the outer periphery of the housing 1 and provide a driving connection between the follower plate 4 and the center plate 20 through the housing 1. The follower rods 5 are resiliently biased into engagement with cams 3 suitably mounted on the rotatable flange 2 and rotatable therewith. The follower rods 5 may be biased towards the cams 3 in any suitable manner, as by compression springs 7, which are seated between the surfaces of the bosses facing the follower plate 4 and nuts 8 suitably threadedly positioned on the follower rods 5. As shown in FIG. 1, the follower plate 4 is rigidly secured to the follower rods 5 in any suitable manner, as by a plurality of nuts 4' secured to the follower rods 5 on each side of the plate 4.

Acceleration or deceleration of the workpiece 22 will result in a relative angular or rotational displacement between the rotatable workpiece 22 and the rotatable flange 2. This relative rotational or angular displacement will cause the cams 3 to have a corresponding rotational or angular displacement relative to the follower plate 4 and follower rods 5, such that the rods 5 will have a linear axial movement relative to the rotatable flange 2 as they travel over the surfaces of the cams 3. This linear movement of the follower rods 5 results in a corresponding linear axial movement of the follower plate 4 and produces a translation of the relative angular or rotational displacement between the rotatable flange 2 and the follower plate 4 into a relative linear movement therebetween. This relative linear movement is directly proportional to the accelerating or decelerating torque transmitted through the rotatable workpiece 22 and is also, therefore, directly proportional to the force exerted upon the workpiece by the tool 23.

In order to measure and indicate or record the linear displacement of the follower plate 4 relative to the rotatable flange 2, and therefore of the relative angular or rotational displacement therebetween, a suitable measuring indicating or recording instrument 24 is adapted to be operated by the follower plate 4. This instrument 24 may conveniently comprise any suitable indicating, registering, or recording device of a conventional type, such as a clock-operated recording tape 25 on which a record may be formed by magnetic recording means or a pen or stylus 26 having an operating arm 27 with a contact element 9 adapted to be biased into engagement with the follower plate 4. In this manner linear axial movements of the plate 4, responsive to corresponding relative angular or rotational displacements of the plate 4 relative to the rotatable flange 2, will produce corresponding movements of the pen or stylus 26, and thereby register or record the linear movements of the follower plate 4. A suitable calibration of the tape 25 can be provided for indicating directly thereon the torque transmitted through the workpiece 22 or by reference to a suitable chart or table, the force exerted upon the workpiece 22 by the tool 23 can be interpolated from the recordings on the tape 25.

While a particular embodiment of this invention has been described and illustrated in this application, modifications thereof will occur to those skilled in the art. It is intended and desired, therefore, to cover all modifications within the spirit and scope of this invention in the claims appended to and forming a part of this specification.

I claim:

1. Apparatus for measuring relative angular displacement between a pair of rotatable members comprising a rotatable support, a relatively rotatable flange mounted for rotation around said rotatable support coaxially therewith, means for driving said rotatable flange from one of said rotatable members through a lost motion connection in one direction of rotation, follower flange means mounted for rotation with said rotatable support coaxially therewith, means for resiliently loading said follower flange means and biasing it toward said rotatable flange, means for providing a driving connection between said follower flange and said rotatable flange constructed to provide for relative angular adjustment between said flanges in accordance with torque transmitted therebetween, follower plate means mounted coaxially with said rotatable support and for axial translation thereof, means for driving said follower plate by the other of said rotatable members through said rotatable support, cam means on said rotatable flange arranged in engagement with said follower plate means for translating relative angular displacement between said rotatable flange and said follower plate means into relative linear axial movement therebetween, means for resiliently biasing said follower plate means into engagement with said cam means, and means responsive to linear movement of said follower plate means for measuring such linear movement whereby relative angular displacement between said rotatable flange and said rotatable support are measured.

2. Apparatus for measuring relative rotational displacement between a pair of rotatable members comprising a rotatable support, a relatively rotatable flange mounted for rotation around said rotatable support coaxially therewith, means for driving said rotatable flange from one of said rotatable members, follower flange means mounted for rotation with said rotatable support coaxially therewith, resilient spring means for loading said follower flange means and biasing it toward said rotatable flange, means providing a limited lost motion driving connection between said follower flange and said rotatable flange including cam means on said rotatable flange arranged in engagement with said follower flange means cooperating with said spring loading means to provide for relative angular adjustment between said flanges in accordance with torque transmitted therebetween and for translating relative rotational displacement between said rotatable flange and said follower flange into relative linear movement therebetween against the biasing force of said resilient spring means, follower plate means mounted coaxially with said rotatable support and for axial translation thereof, means for resiliently biasing said follower plate means toward said relatively rotatable flange, means for driving said follower plate by the other of said rotatable members through said rotatable support, second cam means on said rotatable flange arranged in engagement with said follower plate means for translating relative rotational displacement between said rotatable flange and said follower plate means into relative linear axial movement therebetween, and means responsive to linear movement of said follower plate means for measuring such linear movement whereby relative rotational displacement between said rotatable flange and said rotatable support are measured.

3. Apparatus for measuring changes in transmitted torque between a pair of rotatable members comprising a rotatable support, a relatively rotatable flange mounted for rotation around said rotatable support coaxially therewith, means adapted to be secured to one of said rotatable members for rotation therewith and for driving said rotatable flange, follower flange means mounted for rotation with said rotatable support coaxially therewith, resilient spring means for loading said follower flange means and biasing it toward said rotatable flange, means providing a limited lost motion driving connection between said follower flange and said rotatable flange including cam means on said rotatable flange arranged in engagement with said follower flange means cooperating with said spring loading means to provide for relative angular adjustment between said flanges in accordance with torque transmitted therebetween and for translating relative rotation between said rotatable flange and said follower flange into relative linear axial movement therebetween against the biasing force of said spring means, follower plate means mounted coaxially with said rotatable support and for axial translation thereof, means for driving said follower plate by the other of said rotatable members through said rotatable support, second cam means on said rotatable flange arranged in engagement with said follower plate means for translating relative rotational displacement between said rotatable flange and said follower plate means into relative linear axial movement therebetween, resilient means for biasing said follower plate means into engagement with said second cam means, and means actuated by linear movement of said follower plate means for measuring such linear movement whereby relative rotational displacement between said rotatable flange and said rotatable support are measured and provide a measurement of changes in torque transmitted through said driven member.

4. Apparatus for measuring and registering changes in transmitted torque between a pair of rotatable members comprising a rotatable support, a relatively rotatable flange mounted for rotation around said rotatable support coaxially therewith, means including a connecting clamp adapted to be secured to one of said rotatable members for rotation therewith and for driving said rotatable flange, follower flange means mounted for rotation with said rotatable support coaxially therewith, means including a calibrated compression spring for loading said follower flange means and biasing it toward said rotatable flange, means providing a limited lost motion driving connection between said follower flange and said rotatable flange including cam means on said rotatable flange arranged in engagement with said follower flange means cooperating with said spring loading means to provide for relative angular adjustment between said flanges in accordance with torque transmitted therebetween and for translating relative rotation between said rotatable flange and said follower flange into relative linear axial movement therebetween against the biasing force of said calibrated compression spring, follower plate means mounted coaxially with said rotatable support and for axial translation thereof, means for driving said follower plate by the other of said rotatable members through said rotatable support, second cam means on said rotatable flange arranged in engagement with said follower plate means for translating relative rotational displacement between said rotatable flange and said follower plate means into relative linear axial movement therebetween, resilient spring means for biasing said follower plate means into engagement with said second cam means, and a measuring and registering device actuated by linear movement of said follower plate means for indicating and recording such linear movement whereby relative rotational displacement between said rotatable flange and said rotatable support are measured and provide a measurement of changes in torque transmitted through said driven member.

(References on following page)

References Cited in the file of this patent

UNITED STATES PATENTS

| | | |
|---|---|---|
| 1,488,870 | Danielson | Apr. 1, 1924 |
| 1,637,676 | Bohnszewicz | Aug. 2, 1927 |
| 1,874,838 | Walker | Aug. 30, 1932 |
| 2,261,838 | Allendorff | Nov. 4, 1941 |
| 2,477,457 | Hughes | July 26, 1949 |
| 2,579,349 | Vrooman | Dec. 18, 195_ |
| 2,612,773 | Beadle | Oct. 7, 1952 |
| 2,707,392 | Metrailer | May 3, 1955 |
| 2,715,334 | Mouttet | Aug. 16, 1955 |

FOREIGN PATENTS

| | | |
|---|---|---|
| 686,659 | Germany | Jan. 13, 1940 |